United States Patent [19]

Roule et al.

[11] Patent Number: 5,311,251

[45] Date of Patent: May 10, 1994

[54] AUTOMATIC SETUP OF PHOTOGRAPHIC PRINTER

[75] Inventors: Thomas R. Roule, Mendon; Richard Olliver, Rochester; Dennis N. Beaulieu, Churchville; William G. Irwin, Rochester, all of N.Y.

[73] Assignee: Eastman Kodak Company, Rochester, N.Y.

[21] Appl. No.: 968,752

[22] Filed: Oct. 30, 1992

[51] Int. Cl.5 ............................................. G03B 27/32
[52] U.S. Cl. .......................................... 355/77; 355/38
[58] Field of Search ..................... 355/38, 68, 88, 77

[56] References Cited

U.S. PATENT DOCUMENTS

| | | | |
|---|---|---|---|
| 3,937,573 | 2/1976 | Rising | 355/83 |
| 4,149,799 | 4/1979 | Pone, Jr. et al. | 355/38 |
| 4,159,174 | 6/1979 | Rising | 355/38 |
| 4,168,121 | 9/1979 | Freier et al. | 355/38 |
| 4,236,818 | 12/1980 | Fauchier, II | 355/77 |
| 4,651,199 | 3/1987 | Alkofer | 358/80 |
| 4,657,378 | 4/1987 | Hope et al. | 355/38 |
| 4,707,120 | 11/1987 | Yamamoto | 355/38 |
| 4,710,019 | 12/1987 | Terashita | 355/38 |
| 4,797,713 | 1/1989 | Terashita et al. | 355/77 |
| 4,816,874 | 3/1989 | Terashita et al. | 355/38 |
| 4,933,709 | 6/1990 | Manico et al. | 355/38 |
| 4,962,403 | 10/1990 | Goodwin et al. | 355/38 |

Primary Examiner—Richard A. Wintercorn
Attorney, Agent, or Firm—Francis H. Boos, Jr.

[57] ABSTRACT

A method of operating a photographic printer to provide for automatic setup for a plurality of film types and conditions in which film term data for film types encountered by the printer is automatically created and periodically updated to reflect current experience using accumulated historical density data derived from scanning of film strips and in which exposure of image frames from a current film strip to a photosensitive medium is adjusted either by average density information stored for one or more film types from the historical data or by average density information derived from the current film strip with determination of which average density information to use being made automatically by comparison of either or both of film type or average minimum density information of the film strip with the corresponding stored information. Automatic adjustment of tungsten illumination exposure and automatic updating of slope compensation factors for under- and over-exposed negatives are also described.

7 Claims, 4 Drawing Sheets

AUTOMATIC SETUP OF PHOTOGRAPHIC PRINTER

FIELD OF INVENTION

This invention relates to the field of photographic printers and more specifically to automatic setup of photographic printers to automatically establish and apply historically-based film terms data in generating film frame image exposure information for a variety of film types and film conditions.

BACKGROUND

When printing onto photographic paper, it is known that the average red, green, and blue optical density of a large population similar negatives (e.g. film strips with the same DX code) closely represents the average exposure the paper will receive if the optical filters of the monitor system closely match the paper sensitivity. This is described in the paper "The Influence of Film, Paper, and Printer Spectral Characteristics on Photofinishing Performance by W. C. Kress and P. J. Alessi published in Journal of Applied Photographic Engineering Vol. 9, No. 2 April 1983. Because these data are based on many frames from many film strips, this approach provides an accurate predictor for stable films. The average optical density for the particular film type can then be used in conjunction with data from each individual frame to determine the exposure of that frame. This average density data according to film type along with other film data, collectively referred to as "film term data", can be provided by the film manufacture or, alternatively, it can be determined at the printer from cumulative data derived at the film scanner station from films of the same type. In one known type of printer, the film term data is initially inputted using information supplied by the film manufacturer. Subsequently, the printer operator is given the option of updating the film term density data using cumulative film scanner information derived at the particular printer for each film type encountered by the printer.

An alternative to the derivation of average density data from a large population of films is described in commonly assigned U.S. Pat. No. 3,937,573. In this approach, referred to herein as "order scan" algorithm printing, a printer scanner monitor system is used to characterize a particular film strip by using optical data from several frames on the film strip. Once the density data are characterized for that film strip, this data is then combined with data from each individual frame in the strip to determine the exposure of the frame. This approach provides a means of predicting film strip characteristics when there is considerable variability between film strips or where there is no film term information available, e.g. no DX code for the film strip.

It is therefore desirable to combine these two techniques into one system which uses historical data for stable films and current ("order scan") data for films which deviate from the stable historical data or for which there is little historical data available.

Moreover, until now there has been no convenient method by which historical film data derived at the film scanner can be utilized to update automatically the film term data stored in the memory means of the printer to ensure that printer setup conforms to actual experience of the printing lab with films encountered in daily processing. As a consequence, unless the film operator conscientiously initiated an update procedure, for example during power up operation, print exposure conditions would continue to be based on pre-existing film term data and would not reflect the experience gained from processing populations of actual film strips. It is desirable, therefore, to have a method and means for automatically updating existing film term data using historical data generated on an ongoing basis from scanning populations of actual film strips.

Additionally, it is desirable to be able to create automatically a database of film term data for film types encountered by the printer that are not represented in the existing database of film types stored in the printer memory. This is accommodated in the present invention.

Still further, it is desirable to provide for automatic setup of the printer with historically based film term data pertaining to over- and under-slope correction and tungsten correction based on actual experience of the printer with populations of film encountered during processing. This is also accommodated in the present invention.

SUMMARY OF THE INVENTION

Thus in accordance with the invention, there is provided a method of operating a photographic printer of the type having means for scanning film strips to generate density information from image frames on each film strip, having memory means for storing film term data for one or more film types, said film term data including central tendency information, such as average density information, based on a population of image frames of each film type and having means for exposure of individual image frames from a current film strip onto a photosensitive medium. In its broadest aspect, the method comprises the step of generating central tendency density information for each film strip scanned by said scanner and the step of automatically periodically modifying the stored film term data, using the generated central tendency density information, for each type of film strip scanned since a previous updating of the film term data so as to generate an historical database of film term data based on film types actually encountered by the printer. In a preferred embodiment of the invention, the method further includes the steps of generating film term data from a current film strip, determining the film type of the current film strip, determining whether the current film strip type corresponds to one of the film types having film term data stored in memory and storing the generated film term data in memory as new film term data when the current film strip type does not correspond to a film type stored in memory thereby initiating a new historical database of film term data for a film type not previously existing in the memory. In another embodiment of the invention, the method further includes the steps of using stored film term data for print exposure determination if such data exists in memory for the current film strip, otherwise generating film term data from a plurality of image frames of the current film strip ("order scan" data) and automatically using the generated current film term data for print exposure determination. Still further, the method may include the steps of storing minimum density information for each film type and detecting minimum density of the current film strip. If the detected minimum density is not within a predetermined range of the stored minimum density for this film type, the printer generates and uses the aforementioned order scan data from the current film strip for print exposure determination. In yet another embodiment of the invention, historically derived film term data is used to automatically update over- and under- slope compensation factors by film type as well as subject failure suppression boundary selection criteria.

DETAILED DESCRIPTION

Figure 1:
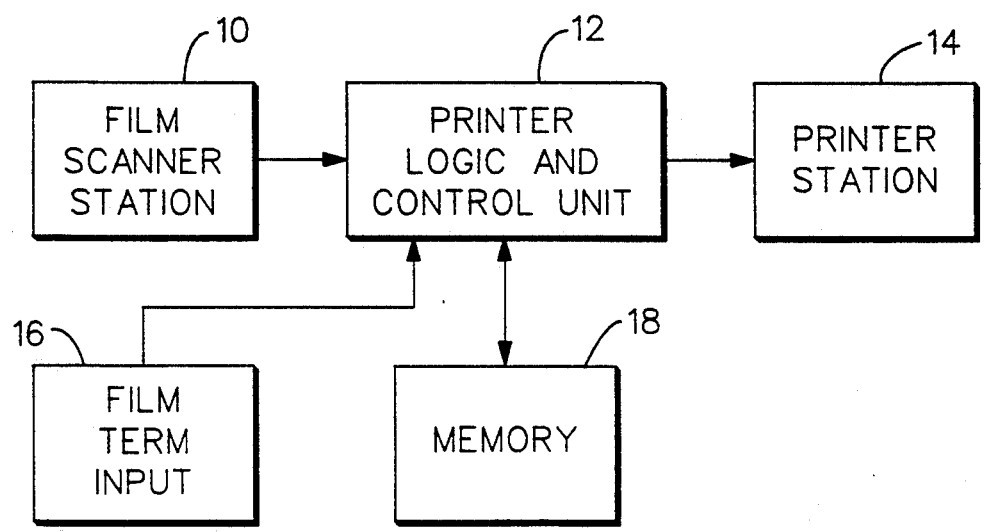
FIG. 1 is a schematic illustration of basic components of a photographic printer adaptable for use with the present invention.

In FIG. 1, the basic components of a photographic printer used in the practice of the present invention includes a film scanner station 10 which derives density data from film strips from which photographic prints are to be produced. The density data is applied to a printer logic and control unit 12 where the data is input to an exposure determining algorithm used to control the printer station 14 in known manner. "Film term" data is also input directly to logic control unit 12 by means of a film term input unit 16 which may comprise, for example, a magnetic disk reader. Film term data comprises data pertaining to particular film types and includes information such as film population offset (FPO), film preference adjustment (FPA), slope compensation values (NEU and NEO) for under- and overexposed negatives, subject failure suppression boundaries (SFS) and printability information (e.g., the limits of under- or over-exposed negatives that can still be printed). A memory unit 18 is provided to store, among other things, data received from scanner 10 or input unit 16 pertaining to film term information used to control the operation of the printer station 14. The details of the construction and general operation of the photographic printer of FIG. 1 are well known and an example of such apparatus is the CLAS 35 photographic printer marketed by Eastman Kodak Company of Rochester, N.Y.

Figure 2:
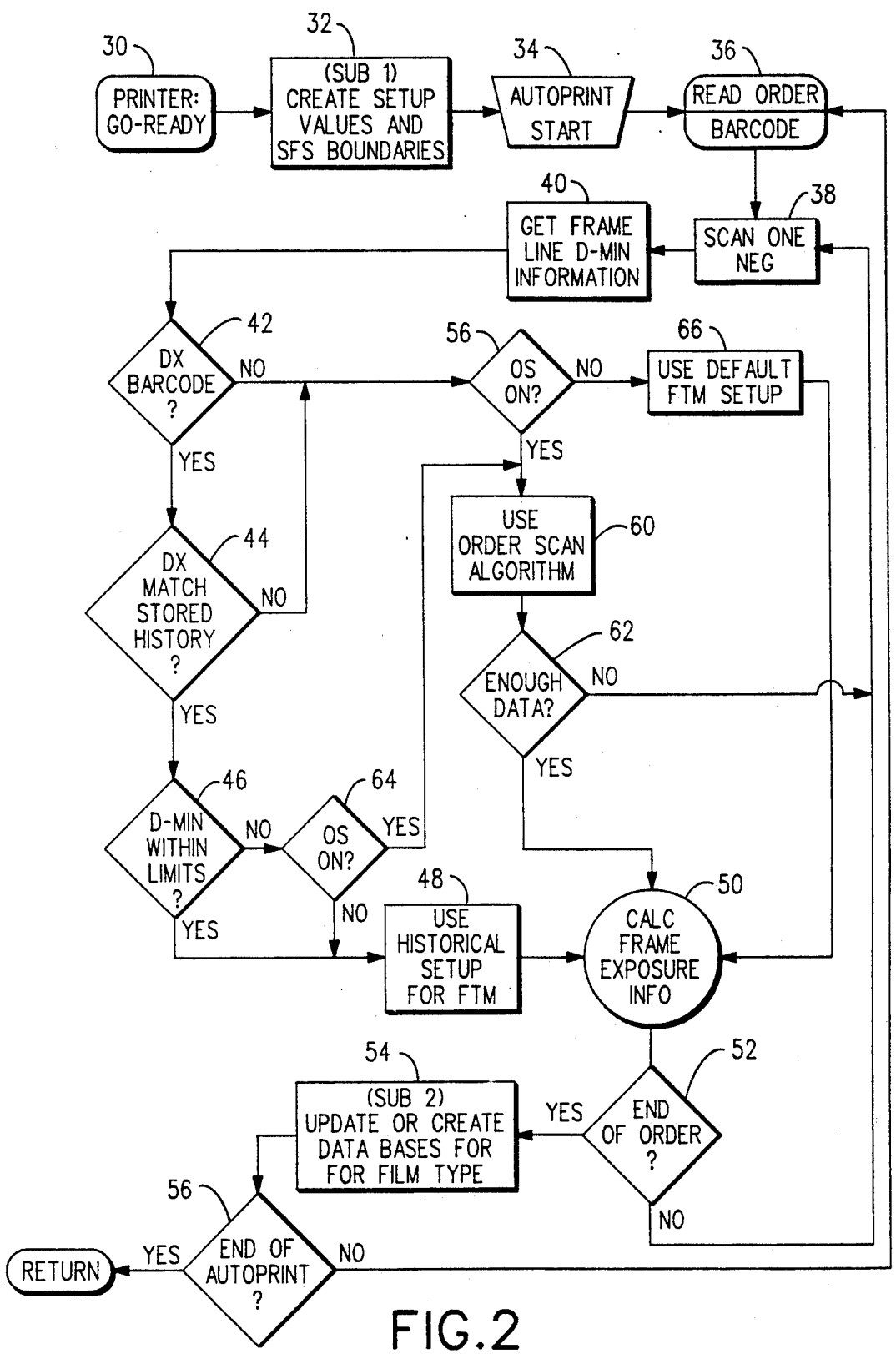
FIG. 2 is a program flow chart used in explaining the operation of the FIG. 1 printer with automatic setup of the present invention.
Figure 3:
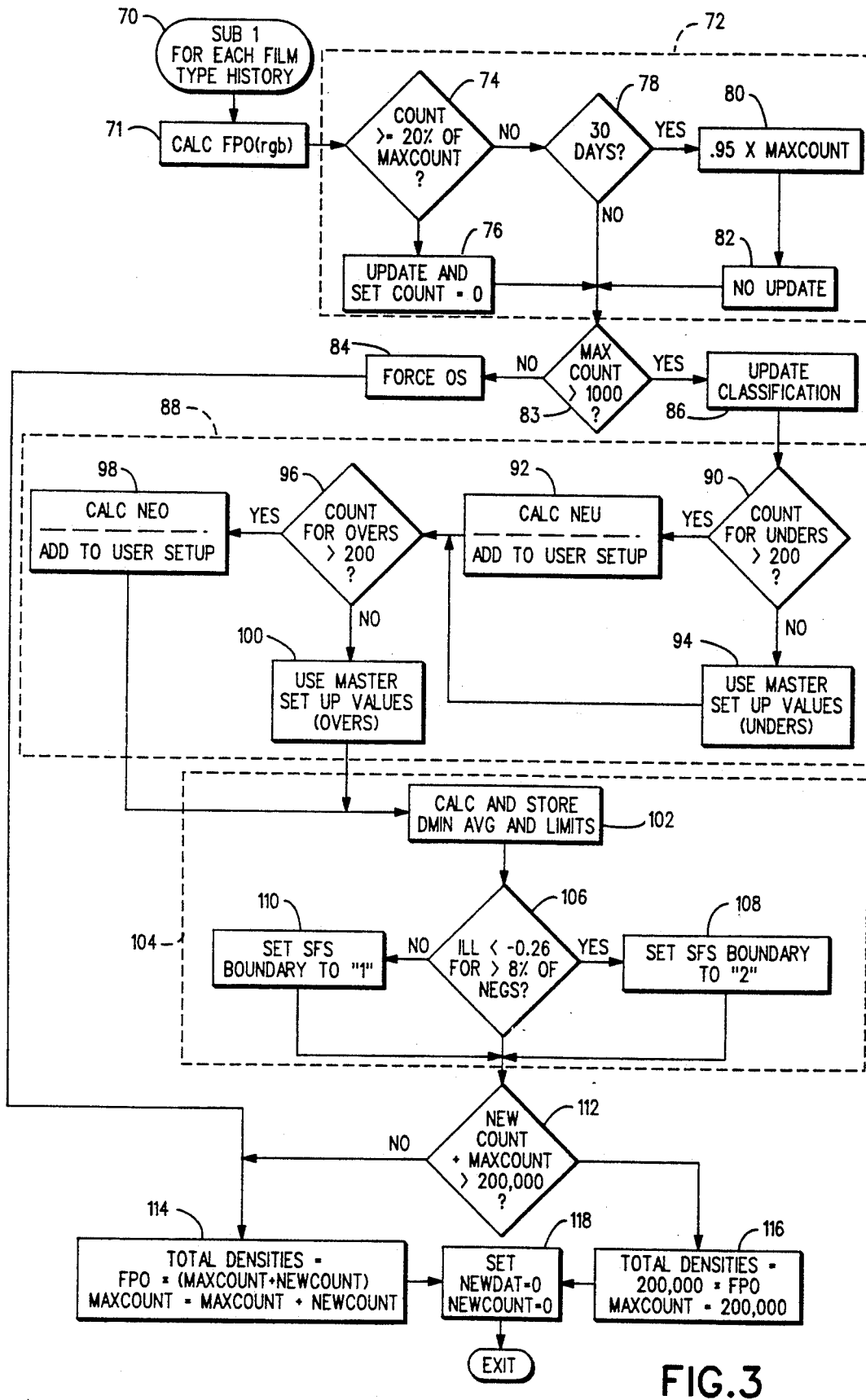
FIG. 3 is a flow chart of a subroutine used in the program of FIG. 2.

The manner in which the logic and control unit can be programmed to operate in accordance with the invention will now be described in connection with the program flow charts of FIGS. 2–4. Referring initially to FIG. 2, when the operator switches the printer from "standby" to "ready" status at step 30, the program enters a SUB1 subroutine 32, the purpose of which is to update film term setup data in printer memory 18 for each different film type for which historical data is kept in the memory. The function of subroutine 32 is to establish updated film term information according to film type by combining historical data for the film type with user input data to create setup values for film population offset (FPO), over- and under-exposure slope correction information and for the selection of appropriate subject failure suppression (SFS) boundaries for the particular film type. The operation of the SUB1 subroutine is described in greater detail hereinafter in connection with the flow chart of FIG. 3.

After completion of subroutine 32, the printer enters the main "autoprint" routine to begin printing of current film orders. In normal fashion, a continuous series of negative film strips, each corresponding to a customer order, is fed through the film scanner station 10. As the film strip is fed into the scanner, the customer order information is read at step 36 and the DX barcode information, assuming one exists for the particular film strip, is fed into the printer logic and control unit 12. The scanner then proceeds at step 38 to scan the first negative or image frame on the film strip as well as the region of the film strip between the frames, generally referred to as the frame line area. In step 40, the frame line minimum density ($D_{min}$) data for this film strip is obtained. Query 42 checks for the existence of a DX barcode on this film strip and, if one exists, query 44 determines if the film strip DX matches DX information available in memory. Assuming it does, query 46 then determines if the frame line $D_{min}$ for this film strip is within a predetermined range of values centered about the historical $D_{min}$ value stored in memory for this DX film type. Assuming it is within the limits, step 48 directs that the calculation in step 50 of frame exposure information for this image frame be determined using the available historical film term setup data from memory 18 that corresponds to this DX barcode. After checking for the existence of an end-of-order indication at step 52, the program returns to instruction 38 to commence scanning the next negative on the film strip. This process continues until the end-of-order indication is sensed at query 52 at the end of the film strip at which time the program enters a SUB2 subroutine at 54 to cause the historical information data bases in memory 18 for this particular film type to be updated. This subroutine is described in greater detail in connection the flow chart of FIG. 4. Upon return from this subroutine, query 56 then determines if the "autoprint" mode is concluded, which would be the case if this were the only or the last film strip in the printer. Assuming there are additional film strips to be processed, the program returns to Step 36 to read the order information and DX barcode of the next film strip fed into the scanner.

It will be appreciated that the operating procedure as it has just been described is the normally encountered operation of the printer in which stable film bearing a DX barcode is processed through the printer. On the other hand, if query 42 determines that there is no DX barcode on the film strip, or if query 44 determines that the sensed film strip DX barcode does not match any of the DX barcodes stored in memory, then, in accordance with one aspect of the invention, the program automatically responds by determining in query 58 whether the printer has been conditioned to operate in a "order scan" (OS) mode and, if so, instruction 60 initiates the order scan procedure for this film strip. The order scan algorithm may be of the type described in aforementioned U.S. Pat. No. 3,937,573 in which the film strip is characterized by using optical data from several frames on the strip. In this procedure, density characteristics (i.e. central tendency information) from the film strip are determined from a predetermined number of successive frames or frame elements (pixels) on the strip which are then used with density information from each image frame to determine exposure for each image frame. When query 62 determines that the requisite number of frames has been scanned, step 50 calculates frame exposure information from the data derived from the film strip rather than from historical data stored in memory.

In a similar vein, if the film strip does have a DX barcode that matches DX codes in memory, as determined by queries 42 and 44, but the frame line $D_{min}$ for the film strip is determined by query 46 to be outside of the predetermined acceptable range of $D_{min}$ values for that film type, query 64 determines if the OS operation is available and, if so, initiates the order scan algorithm process. Finally, if there is no available historical data in memory as determined by queries 42 and 44, and query 56 determines that the OS operation is not available, instruction 66 causes frame exposure information to be determined using default film term information. This default set of film term setup data is normally operator inputted and might, for example, be based on data which corresponds to the most commonly used film type in the region in which the photofinishing lab is located. On the other hand, if historical data is available for the film type of the current film strip, but query 46 determines the film strip is outside the $D_{min}$ limits and query 64 determines that OS is not available, the printer then uses the available historical data for the DX barcode corresponding to the film strip to calculate frame exposure information. This would generally be preferred to using standard default film term setup information since the historical film term setup data available for this DX coded film strip, even though not optimum for this "out-of-limits" film strip, is likely to be closer than the standard, somewhat generic default setup information that would result from invoking instruction 66. Thus it can be seen that with the method of operating the printer as described above, the printer will automatically determine the appropriate film term setup information for a current film strip without intervention by the operator, even when no film type (DX) is available or when the actual $D_{min}$ for film with DX available does not conform to information in memory for that particular DX film type.

It will be recalled that each time the printer is switched from "standby" to "ready" status, the historical film term data for each film type is updated in subroutine SUB1. The program flow chart for this subroutine is shown in FIG. 3. It will be understood that each step described in regard to this subroutine pertains to a particular film type and thus is repeated until the update for all film types in memory is completed. Upon entering this update subroutine at 70, step 71 causes the film population offset (FPO) values for each of the red, green and blue densities of a film type to be calculated in accordance with the relationship:

$$FPO_{(rgb)} = \frac{DAT_{(rgb)} + NEWDAT_{(rgb)}}{(MAXCOUNT + NEWCOUNT)} \quad (1)$$

where:
 DAT(rgb) is the sum of historical red, green and blue average density information for this film type;
 NEWDAT(rgb) is the sum of the densities since the last update.
 MAXCOUNT is the average number of image frames for which historical data is maintained over a selected time period, in this case 30 days; and
 NEWCOUNT is the number of image frames printed for this film type since last update.

Once the density information is updated, module 72 updates the image frame count to adjust for the volume of film processed of this film type. Query 74 determines if the count since last update is greater than some predetermined level, e.g. 20%, of MAXCOUNT and, if so, step 76 updates the date for this film type data to the current date and resets the image frame count to zero. If the count is less than this threshold, query 78 determines whether the time since last update is greater than an appropriate predetermined threshold value, such as 30 days, which would indicate a low volume film type. If it is a low volume film type, instruction 80 multiplies MAXCOUNT by a predetermined weighting factor, e.g. 0.95, after which step 82 suppresses update of date and count information for this film type. Multiplying MAXCOUNT by the weighting factor, the selection of which is a matter of choice, has the effect of giving greater weight to new data in any future update of the density data for this low volume film type.

After module 72, query 83 determines if MAXCOUNT is above a minimum threshold level of 1,000 image frames and, if not, step 84 sets the instruction not to use historical data for this film type but rather to force the use of order scan, if available, in determining exposure information. The assumption is that less than 1000 frames provides insufficient historical data to provide reliable film term data for this film type. If the count exceeds this threshold, step 86 updates the film type classification information. The function of this step is to center the classification of a film type around the average to obtain proper correction for over-and underexposed negatives. The average classification is defined by total classification divided by MAXCOUNT. Following this, module 88 determines the over-exposure and under-exposure slope compensation factors for this film type. Assuming the cumulative number of "unders", i.e. under-exposed negatives, is determined by query 90 to be greater than a predetermined threshold, e.g. 200, step 92 causes under slope compensation factors to be calculated in accordance with the algorithms described below and the results added to the user setup information in memory 18. If fewer than 200 "unders", then step 94 sets the instruction to use predetermined master set up values for the "unders". Similarly, query 96 determines whether new slope compensation values are to be calculated for over-exposed negatives in step 98 or whether to use master set up values according to step 100.

The premise behind the determination of corrections for over- and under-exposed negatives is to calculate the change in each color with respect to the change in neutral density for the negative. In the preferred embodiment of this invention, density information is based on density values calculated after conversion from red, green and blue density values to corresponding values in another color space referred to for convenience as "T-Space". The details of this conversion are described fully in commonly assigned U.S. Pat. No. 4,159,174 the disclosure of which is incorporated herein by reference. As explained in this patent, operation in T-Space convention is more suitable for performing compensating calculations for negatives with subject failure characteristics. For over-exposed negatives, the average deweighted T-Space density including classification of negatives approximately 1.5 to 3.5 stops over-exposed relative to the population average is accumulated. Deweighted density is defined as the density after subject failure suppression (SFS) is applied. For under-exposed negatives, the average deweighted T-Space density including classification of negatives approximately 1.5 to 2.25 stops under-exposed relative to the population average is accumulated. The T-Space equations for adjusting over-exposed negatives (o) and under-exposed negatives (u), respectively, are as follows:

$$ADJ(illave_x) = \frac{illave_x - FPO(ill)}{NAVC_x} \quad (2)$$

$$ADJ(gmave_x) = \frac{gmave_x - FPO(gm)}{NAVC_x} \quad (3)$$

Where:
 x=u or o for under- and over-exposed negatives, respectively.
 $ADJ(illave_x)$=The adjustment to illuminant under- and over-slope corrections.
 $ADJ(gmave_x)$=The adjustment to green-magenta under- and over-slope corrections.
 $illave_x$=The average deweighted T-Space illuminant density of the under- and over-exposed population of negatives.
 $gmave_x$=The average deweighted T-Space green-magenta density of the under- and over-exposed population of negatives.
 FPO(ill)=The illuminant T-Space equivalent of the average population of all negatives.
 FPO(gm)=The green-magenta T-Space equivalent for the average population of all negatives.
 $NAVC_x$=the neutral T-space average density including classification.

When the red, green and blue relationships for over-exposed negatives are parallel, the slope for these relationships can be defined as:

$$storedNE(x)_r = 1.00 \quad (4)$$

$$storedNE(x)_g = 1.00 \quad (5)$$

$$storedNE(x)_b = 1.00 \quad (6)$$

These values may be adjusted manually to be greater or less that 1.00 at the option of the printer operator. Given these stored values and the adjustment values calculated according to equations (2) and (3), the red, green and blue exposure values, as adjusted for unders and overs becomes:

$$adjNE(x)_r = storedNE(x)_r - \frac{ADJ(gmave_x)}{\sqrt{6}} - \frac{ADJ(illave_x)}{\sqrt{2}} \quad (7)$$

$$adjNE(x)_g = storedNE(x)_g + \frac{2(ADJ(gmave_x))}{\sqrt{6}} \quad (8)$$

$$adjNE(x)_b = storedNE(x)_b - \frac{ADJ(gmave_x)}{\sqrt{6}} + \frac{ADJ(illave_x)}{\sqrt{2}} \quad (9)$$

After leaving module 88, the program enters module 104 which is provided to select appropriate boundary conditions for subject failure suppression used to compensate for those film types which the accumulated historical information indicates have a higher than expected occurrence of exposure under tungsten lighting conditions. Step 102 initiates calculation of average $D_{min}$ and the acceptable limits of variation of $D_{min}$ for this film type in accordance with the teachings of the aforementioned U.S. Pat. No. 4,159,174 and stores them in memory for use in the main "Autoprint" routine of FIG. 2. Next, query 106 determines whether the number of scanned negatives with an illuminant density less than a preselected value, e.g. −0.26, is above or below some predetermined percentage, e.g. 8%, of the total number of scanned negatives. In the illustrated embodiment, if the answer is "no", i.e. the number of negatives with an illuminant value less than −0.26 did not exceed 8% of the scanned negatives, then step 110 invokes a subject failure suppression boundary (SFS) which is appropriate for populations of negatives having a low incidence of tungsten illuminated scenes. This boundary is referred to as boundary "1" in step 110. On the other hand, if query 106 determines that greater than 8% of the scanned negatives had an illuminant value below −0.26, then step 108 invokes an SFS boundary condition that is appropriate for populations of negatives having a high incidence of tungsten illuminated scenes, referred to in step 108 as boundary "2". The subject of subject failure suppression boundaries and how to determine appropriate boundary conditions is well known in the art and need not be explained in detail here.

It is desirable to keep the adjustment of FPO such that it is representative of the most recent negatives. In order to accomplish this, the number of negatives from a large running film type is limited to the average that might be encountered in a predetermined time period (e.g. 200,000 in a 30 day period). This is accomplished by query 112. If the number of negatives for the film type exceeds 200,000 (the sum of MAXCOUNT and NEWCOUNT) then the count is limited to 200,000 and the population center (FPO(rgb)) is multiplied by 200,000 and the resultant densities are stored in memory in step 116. If the number of negatives is less than 200,000 then the total negatives (MAXCOUNT and NEWCOUNT) are added and the result is multiplied by FPO(rgb) to obtain densities to store in memory as shown in step 114. Similarly, the percentage of unders and overs relative to MAXCOUNT is limited to a predetermined value (e.g. 20%). Step 118 then sets the default PRINTABILITY data and sets each of the NEWDAT(rgb) densities and count "NEWCOUNT" to a value of "0".

Figure 4:
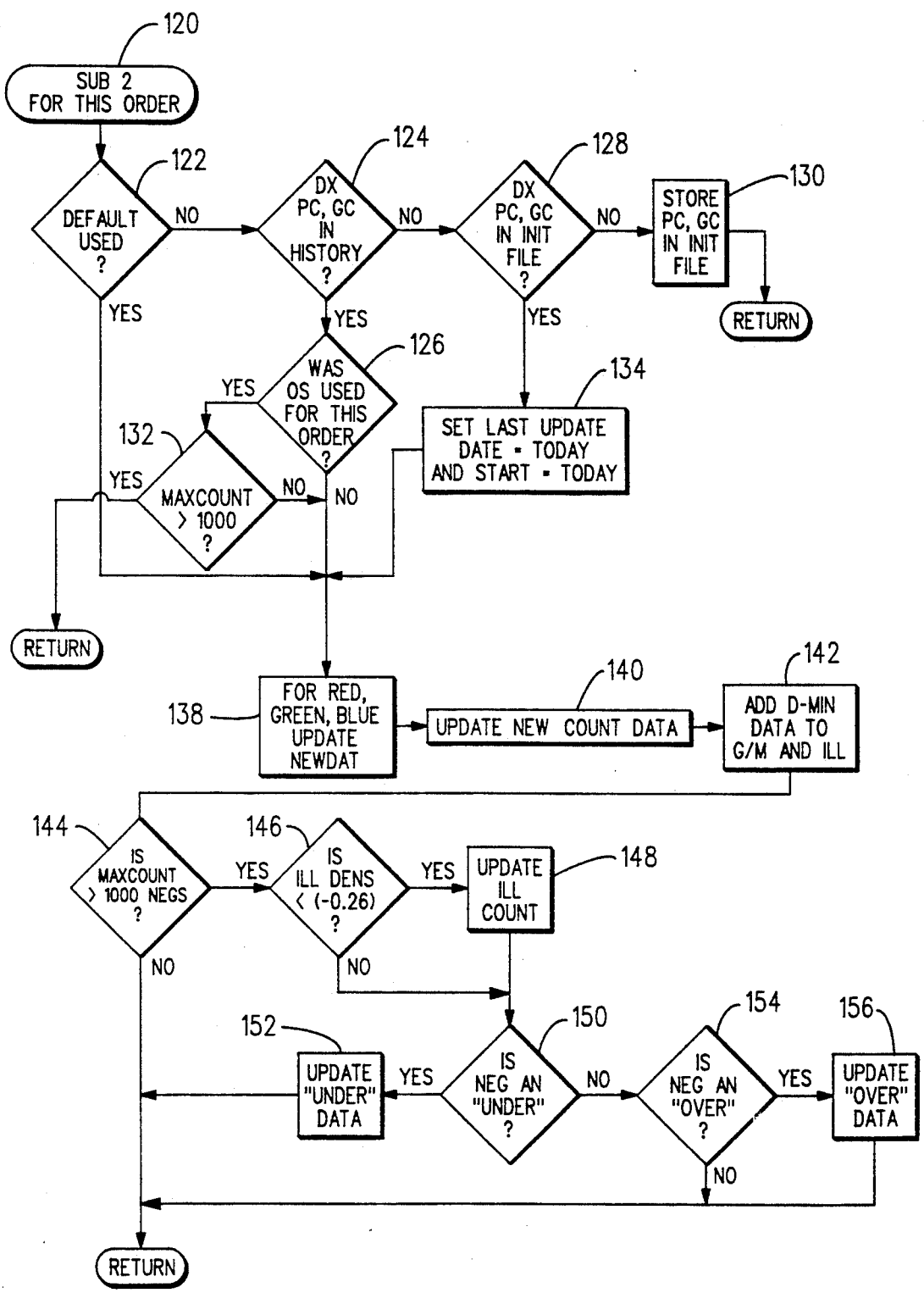
FIG. 4 is a flow chart of a subroutine used in the program of FIG. 2.

Referring now to FIG. 4, there is shown the details of SUB2 subroutine 54 (FIG. 2) which is used to update the historical film data in memory. In the illustrated preferred embodiment of the invention, this is done at the conclusion of the scanning of each film strip at the end of each order. However, it will be appreciated that updating at other intervals may be used, for example on a frame-by-frame basis.

Upon entry into the subroutine, query 122 determines whether default film term (FTM) values were used in calculating exposure for this film strip. It will be recalled that selection and use of default FTM values is a function of query 56 and instruction 66 of the SUB1 subroutine of FIG. 2 when an unknown film type is encountered and the printer is not set for use of the order scan algorithm. If default FTM was not used, then query 124 determines if the product code (PC) and generation code (GC) from the DX barcode for this film strip exist in the historical database. If not, the assumption would be that this is a new bar code encountered by the printer. However, it is first preferable that the validity of the sensed barcode be verified since it is desirable to provide some protection against erroneous barcode readings. The basis of the validity check is that if a barcode with this PC and GC is encountered more than once, it is assumed to be a valid barcode. To do this, query 123 and instruction 130 responds to the first time encounter with a particular bar code by causing the bar code to be recorded in an "init file" after which the routine returns to the main program without update of the historical database. The next time this barcode is encountered, as determined by query 128, the routine passes to instruction 134 which causes the film type to be initialized with a new "last update" date and starting date after which the historical data for this film type is entered into the database.

If query 124 determined that the barcode already exists in the history database, the routine goes to query 126 which determines if the order scan algorithm was used for this film strip order. If an established population of negatives exists in the historical database for this film strip type (e.g. 1,000 frames) but the order scan algorithm was used, it is normally not desirable to update the data base by including the information from this film strip. This is because the order scan algorithm is typically invoked because the film strip may have been fogged, misprocessed or had some other damage. Thus, if query 126 determines that the order scan algorithm was used and query 132 determines that a predetermined large population of negatives exists for this film type (greater than 1,000 frames in this example), the subroutine bypasses the update process and returns to the main program. If, on the other hand, queries 126 and 132 determine that order scan algorithm was not used or that it was used but the population of negatives for this film type is small, then the historical data base is updated.

The actual updating of the historical database for red, green and blue information begins at instruction 138 in which the average red, green and blue density information from some or all the negatives in the order are added to NEWDAT(rgb). The number of negatives from the order is added to NEWCOUNT in step 140. Optionally, the T-Space Green/Magenta and Illuminant densities for $D_{min}$ are added to the $D_{min}$ data base in step 142.

If more than 1000 negatives have been scanned (as determined by MAXCOUNT in query 144), then query 146 checks to see if negatives in the order were potentially exposed under tungsten illumination. If the response to query 146 is positive, then the count and the T-Space density sums are computed in step 148. Following this check for tungsten negatives, the routine checks in queries 150 and 154 to see if the negatives are under- or over-exposed, respectively. As previously explained, if the deweighted T-Space density of any negatives in the order are between 1.5 and 2.25 stops under-exposed relative to the population average, then the T-Space "under" data is updated in step 152 and the number of negatives is added to the "under negative count. Similarly, if the negatives are over-exposed, (between 1.5 stops and 3.5 stops), the T-Space density information is added to the "over" data in step 156 and the number of "over" negatives is added to the "over" count. At the conclusion of this update process (or if queries 150 and 152 determined that no "under" or "over" negatives were involved) the subroutine returns to the main program "Autoprint" of FIG. 2.

In the foregoing description, reference is made to the use of average values for the history data. It will be appreciated by those skilled in the art, however, that there are many other measures of central tendency, such as mode, median, clipped averages, weighted averages, etc. which could be used instead of, or in conjunction with average. Thus while the average is used herein, it should be understood that this term can also refer to any similar measure of central tendency.

From the foregoing, it will be appreciated that what has been described is a method of operating a photographic printer that advantageously performs automatic updating of historical film data to reflect regional laboratory experience with film strips of varying types and conditions. The method also automatically creates an historical film term database for recurring film types that have no preexisting film term data in the printer memory data base. A printer operating with the method described is able to select, automatically, between historical film term data and order scan algorithm exposure determination for a current film strip without operator intervention. And finally, the automatic creation and update of historical film term data in the memory database is advantageously utilized to provide improved over- and under-slope compensation and improved automatic subject failure suppression boundary selection.

The invention has been described in detail with particular reference to a presently preferred embodiment, but it will be understood that variations and modifications can be effected within the scope of the invention as set forth in the claims appended hereto.

What is claimed is:

1. A method of operating a photographic printer having means for scanning film strips to generate density information from image frames on each film strip; memory means for storing film term data for one or more film types, said film term data including central tendency density information based on a population of image frames of each film type; and having means for exposure of individual image frames from a current film strip onto an image recording medium; the method comprising the steps of:

generating central tendency density information for each film strip scanned by said scanner; and automatically periodically modifying said stored film term data, using said generated central tendency density information, for each type of film strip scanned since a previous updating of said film term data so as to use an historical database of film term data based on film types actually encountered by said printer to use in the determination of exposures for individual frames.

2. The method of claim 1 further including the steps of:

generating film term data from said current film strip;
determining the film type of said current film strip;
determining whether said current film strip type corresponds to one of said film types having film term data stored in memory; and
storing said generated film term data in said memory as new film term data when said current film strip type does not correspond to a film type stored in memory so as to initiate a new historical database of film term data for a film type not previously existing in said memory.

3. The method of claim 1 further including the steps of:

determining whether said current film strip corresponds to one of said film types having film term data stored in memory;
using said stored film term data of said one film type for print exposure if said current film strip type corresponds to said one film type; and, if not, then generating film term data from a plurality of image frames of said current film strip and automatically selecting said generated current film term data for print exposure.

4. The method of claim 3 wherein said film term data includes average minimum density information, further including the steps of:

generating minimum density information for said current film strip;

if said current film type corresponds to a film type in memory, further determining whether said current film strip minimum density information corresponds to stored average minimum density information for said one film type; and, if not, then using said generated current film term data for print exposure and, if so, using said stored film term data for print exposure.

5. The method of claim 4 wherein said stored film term data is used for print exposure only if said current film strip minimum density is within a predetermined range of said stored film type minimum density information.

6. The method of claim 1 wherein said film term data stored in memory includes slope compensation factors for under- and over-exposed frame images and wherein the method further includes the step of generating from cumulative historical data, and storing in memory, revised slope compensation factors for under- and/or over-exposed image frames for each film type for which accumulated number of under- and/or over-exposed image frames exceed a predetermined threshold number.

7. The method of claim 1 wherein said film data stored in memory includes a plurality of predetermined subject failure suppression boundary conditions for each film type and wherein the method includes automatic selection of one of said boundary conditions dependent upon sensed illuminant values of a plurality of image frames from cumulative historical data.

* * * * *